United States Patent
Watanabe et al.

(10) Patent No.: US 11,896,877 B2
(45) Date of Patent: Feb. 13, 2024

(54) GOLF BALL

(71) Applicant: Bridgestone Sports Co., Ltd., Tokyo (JP)

(72) Inventors: Hideo Watanabe, Saitamaken (JP); Akira Kimura, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 17/881,997

(22) Filed: Aug. 5, 2022

(65) Prior Publication Data

US 2023/0082849 A1 Mar. 16, 2023

(30) Foreign Application Priority Data

Aug. 26, 2021 (JP) .................. 2021-137782

(51) Int. Cl.
*A63B 37/06* (2006.01)
*A63B 37/00* (2006.01)
*C08L 9/00* (2006.01)

(52) U.S. Cl.
CPC .... *A63B 37/00922* (2020.08); *A63B 37/0063* (2013.01); *A63B 37/0064* (2013.01); *A63B 37/0065* (2013.01); *A63B 37/0075* (2013.01); *A63B 37/0089* (2013.01); *A63B 37/0096* (2013.01); *C08L 9/00* (2013.01); *C08L 2207/53* (2013.01)

(58) Field of Classification Search
CPC .................. A63B 37/0062; A63B 37/0063
See application file for complete search history.

(56) References Cited

U.S. PATENT DOCUMENTS

| | | |
|---|---|---|
| 2011/0143861 A1 | 6/2011 | Watanabe et al. |
| 2011/0250991 A1 | 10/2011 | Isogawa et al. |
| 2011/0319193 A1 | 12/2011 | Isogawa et al. |
| 2012/0010021 A1 | 1/2012 | Fushihara et al. |
| 2013/0005506 A1 | 1/2013 | Isogawa et al. |
| 2013/0005508 A1* | 1/2013 | Matsuyama ....... A63B 37/0033 473/376 |
| 2013/0157781 A1 | 6/2013 | Sullivan et al. |
| 2013/0296072 A1 | 11/2013 | Nakajima et al. |
| 2013/0296075 A1 | 11/2013 | Kimura et al. |
| 2013/0296076 A1 | 11/2013 | Kimura et al. |
| 2013/0296077 A1 | 11/2013 | Kimura et al. |

(Continued)

FOREIGN PATENT DOCUMENTS

| | | |
|---|---|---|
| JP | 2011-120898 A | 6/2011 |
| JP | 2011-217857 A | 11/2011 |

(Continued)

*Primary Examiner* — Raeann Gorden
(74) *Attorney, Agent, or Firm* — Sughrue Mion, PLLC

(57) ABSTRACT

In a golf ball for professional golfers and skilled amateurs which has a single-layer core, a cover and at least one intermediate layer therebetween, the sphere obtained by encasing the core with the intermediate layer (intermediate layer-encased sphere) and the ball have a surface hardness relationship which satisfies the condition:

(surface hardness of intermediate layer-encased sphere)>(surface hardness of ball).

The core has a diameter of from 35.5 to 39.5 mm and a distinctive hardness profile that satisfies specific conditions. The ball is endowed with both an excellent flight performance and excellent durability to repeated impact.

10 Claims, 4 Drawing Sheets

(56) References Cited

U.S. PATENT DOCUMENTS

| | | |
|---|---|---|
| 2013/0324318 A1 | 12/2013 | Isogawa et al. |
| 2014/0100059 A1 | 4/2014 | Kimura et al. |
| 2014/0357407 A1 | 12/2014 | Shindo et al. |
| 2016/0175660 A1 | 6/2016 | Watanabe et al. |
| 2016/0175661 A1 | 6/2016 | Watanabe et al. |
| 2016/0279484 A1 | 9/2016 | Watanabe et al. |
| 2016/0354644 A1 | 12/2016 | Watanabe et al. |
| 2016/0361605 A1 | 12/2016 | Watanabe et al. |
| 2017/0106245 A1 | 4/2017 | Kimura et al. |
| 2017/0113100 A1 | 4/2017 | Watanabe et al. |
| 2017/0304684 A1* | 10/2017 | Isogawa ............ A63B 37/0063 |
| 2019/0351293 A1 | 11/2019 | Watanabe et al. |
| 2019/0375917 A1 | 12/2019 | Shindo |
| 2021/0106878 A1 | 4/2021 | Watanabe et al. |
| 2021/0106879 A1 | 4/2021 | Watanabe et al. |

FOREIGN PATENT DOCUMENTS

| | | |
|---|---|---|
| JP | 2012-10726 A | 1/2012 |
| JP | 2012-19820 A | 2/2012 |
| JP | 2013-9814 A | 1/2013 |
| JP | 2013-31640 A | 2/2013 |
| JP | 2013-230361 A | 11/2013 |
| JP | 2013-230362 A | 11/2013 |
| JP | 2013-230363 A | 11/2013 |
| JP | 2013-230365 A | 11/2013 |
| JP | 2013-248298 A | 12/2013 |
| JP | 2015-6314 A | 1/2015 |
| JP | 2015-77405 A | 4/2015 |
| JP | 2016-112308 A | 6/2016 |
| JP | 2016-116627 A | 6/2016 |
| JP | 2016-179052 A | 10/2016 |
| JP | 2017-183 A | 1/2017 |
| JP | 2017-470 A | 1/2017 |
| JP | 2017-77355 A | 4/2017 |
| JP | 2017-79905 A | 5/2017 |
| JP | 2019-198465 A | 11/2019 |
| JP | 2019-213606 A | 12/2019 |
| JP | 2021-62026 A | 4/2021 |
| JP | 2021-62036 A | 4/2021 |

* cited by examiner

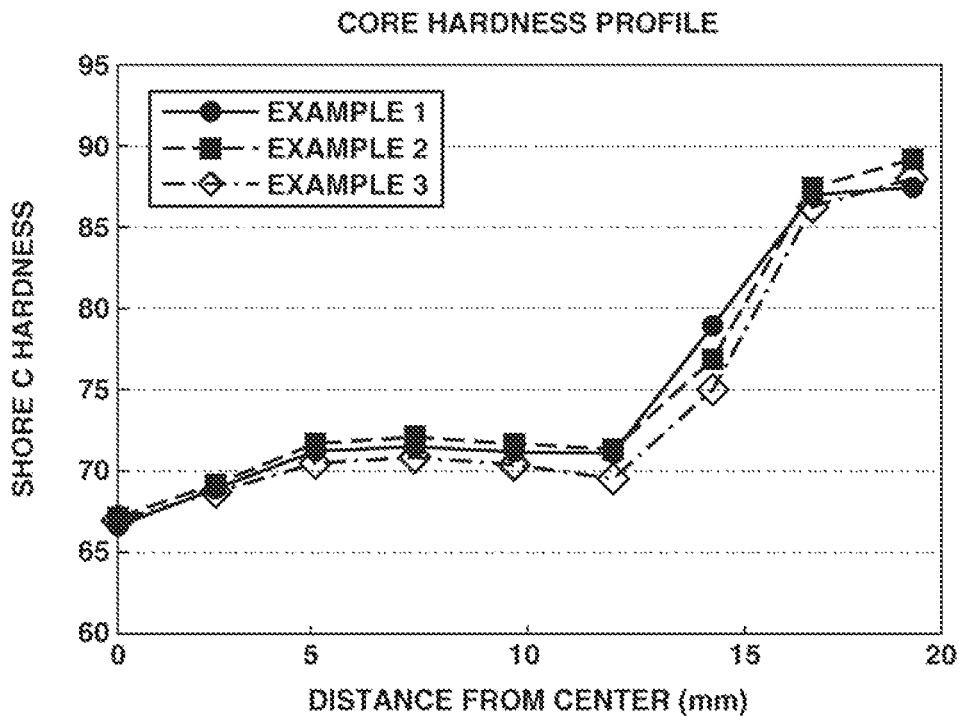
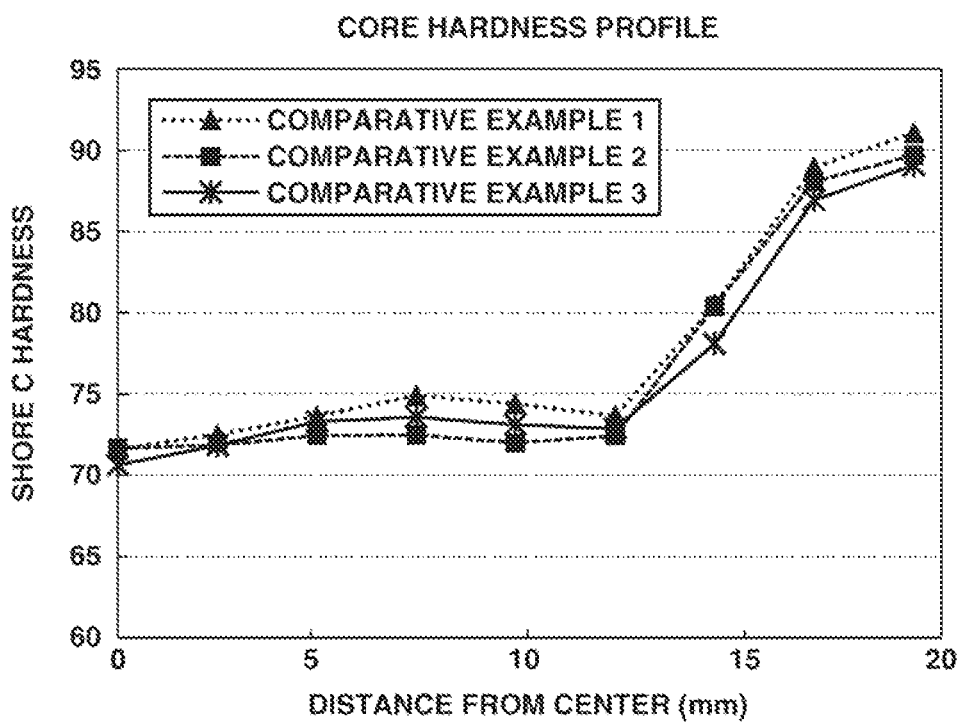

GOLF BALL

CROSS-REFERENCE TO RELATED APPLICATION

This non-provisional application claims priority under 35 U.S.C. § 119(a) on Patent Application No. 2021-137782 filed in Japan on Aug. 26, 2021, the entire contents of which are hereby incorporated by reference.

TECHNICAL FIELD

The present invention relates to a golf ball for professional golfers and skilled amateurs which has a construction of three or more pieces that includes a core, a cover, and at least one layer interposed between the core and the cover.

BACKGROUND ART

Multi-piece solid golf balls such as three-piece solid golf balls are commonly used as golf balls for professional golfers and skilled amateurs. Multi-piece solid golf balls generally have a construction in which a core made of a rubber composition is encased by a multi-layer cover composed of various resin materials. The core accounts for most of the golf ball volume and exerts a large influence on ball properties such as the rebound, feel at impact and durability. In a number of recent disclosures in the art, the cross-sectional hardness of the core has been adjusted to create a special core hardness gradient, enabling the ball to achieve an increased distance owing to optimization of the spin characteristics on full shots with a driver and iron clubs. In addition, covers made of polyurethane are often used as the outermost layer (cover) in golf balls for skilled amateur golfers and professionals. Improving the durability of golf balls having a soft urethane cover to cracking on repeated impact is thus important as well.

Exemplary methods for adjusting the cross-sectional hardness of the core include suitably adjusting the compounding ingredients in the rubber composition for the core, and suitably adjusting the vulcanization temperature and time. For example, JP-A 2011-120898, JP-A 2013-230361, JP-A 2013-230362, JP-A 2013-230363, JP-A 2015-077405, JP-A 2013-230365, JP-A 2016-112308, JP-A 2016-116627, JP-A 2016-179052, JP-A 2017-000183, JP-A 2017-000470, JP-A 2017-077355, JP-A 2017-079905, JP-A 2019-198465, JP-A 2019-213606, JP-A 2021-062026, JP-A 2021-062036, JP-A 2011-217857, JP-A 2012-019820, JP-A 2012-010726, U.S. Published Patent Application No. 2013/0157781, JP-A 2015-006314, JP-A 2013-009814, JP-A 2013-031640 and JP-A 2013-248298 describe special core interior cross-sectional hardnesses achieved by, with regard to the compounding ingredients within the core-forming rubber composition, selecting the types and adjusting the contents of co-crosslinking agents and organic peroxides and additionally including other ingredients such as water and aromatic organosulfur compounds.

However, the golf balls described in the foregoing patent literature fail to provide even higher levels of both distance when played by high head-speed golfers and durability upon repeated impact, and so further increases in both flight performance and durability on impact are desired.

SUMMARY OF THE INVENTION

It is therefore an object of the present invention to provide a golf ball for professional golfers and skilled amateurs which achieves high levels of both flight performance and durability on repeated impact.

As a result of intensive investigations, we have found that, in a golf ball having a single-layer core, a cover and at least one intermediate layer interposed between the core and the cover, certain advantageous effects can be achieved by having the surface hardness relationship between the sphere obtained by encasing the core with the intermediate layer (intermediate layer-encased sphere) and the ball satisfy the condition (surface hardness of intermediate layer-encased sphere)>(surface hardness of ball), designing the core diameter so as to be from 35.5 to 39.5 mm, and moreover constructing the golf ball in such a way as to satisfy the following conditions in the core hardness profile:

$(H75-H50)>(H25-H0)>(H100-H87.5)>(H50-H25)$ $23.0 \geq (H87.5-H0) \geq 17.0$ absolute value of $(H87.5-H0)/(H50-H0) \geq 3.0$, where H100 is the Shore C hardness at the core surface and Hk is the Shore C hardness at a position k % of the core radius outward from the core center. Namely, the distance traveled by the ball when struck with a driver (W #1) or a long iron in the high head-speed (HS) range by a professional golfer or a skilled amateur can be sufficiently increased and the durability of the ball on repeated impact can be enhanced. Moreover, a high controllability can be achieved on approach shots in the short game.

That is, the golf ball of the invention is a golf ball for professional golfers and skilled amateurs which has a relatively soft cover that enables a high level of spin control in the short game, a hard intermediate layer that suppresses excessive receptivity to spin on full shots, and a core with a specific hardness profile that confers the ball with both a good flight in the high head-speed range and also good durability to cracking on repeated impact. The golf ball of the invention achieves a superior distance owing to synergistic effects between a reduced spin rate and a high initial velocity on shots, which effects are primarily attributable to the fact that the core is produced with a specific hardness profile. Moreover, the inventive golf ball having this core hardness profile structure also possesses a high durability to repeated impact.

In the golf ball of the invention, "high head-speed range" refers to the head speed range of professional golfers and skilled amateurs having head speeds of generally from 46 to 57 m/s.

Accordingly, the invention provides a golf ball having a single-layer core, a cover and at least one intermediate layer interposed between the core and the cover, wherein the sphere obtained by encasing the core with the intermediate layer (intermediate layer-encased sphere) and the ball have a surface hardness relationship therebetween which satisfies the condition:

(surface hardness of intermediate layer-encased sphere)>(surface hardness of ball);

the core has a diameter of from 35.5 to 39.5 mm and a corresponding radius; and the core has a hardness profile which satisfies the following conditions:

$(H75-H50)>(H25-H0)>(H100-H87.5)>(H50-H25)$ $23.0 \geq (H87.5-H0) \geq 17.0$ absolute value of $(H87.5-H0)/(H50-H0) \geq 3.0$, where H100 is the Shore C hardness at a surface of the core, H87.5 is the Shore C hardness at a position 87.5% of the core radius outward from a center of the core, H75 is the Shore C hardness at a position 75% of the core radius outward from the core center, H62.5 is the Shore C hardness at a position 62.5% of the core radius outward from the core center, H50 is the Shore C hardness at a position 50% of the core radius outward from the core center, H37.5 is the Shore C hardness at a position 37.5% of the core radius outward from the core center, H25 is the Shore C hardness at a position 25% of the core radius outward from the core center, H12.5 is the Shore C hardness at a position 12.5% of the core radius outward from the core center and H0 is the Shore C hardness at the core center.

In a preferred embodiment of the golf ball of the invention, the ball satisfies the condition:

$$0 \leq (H100 - H87.5) \leq 3.0.$$

In another preferred embodiment, the ball satisfies the condition:

$$4.0 \leq (H75 - H50) \leq 9.0.$$

In yet another preferred embodiment, the ball satisfies the condition:

$$-1.0 \leq (H50 - H25) \leq 1.0.$$

In still another preferred embodiment, the ball satisfies the condition:

$$3.0 \leq (H25 - H0) \leq 6.0.$$

In a further preferred embodiment, the core has a deflection of from 2.5 to 3.5 mm when compressed under a final load of 1,275 N (130 kgf) from an initial load of 98 N (10 kgf) and the ball has a deflection of from 2.1 to 2.8 mm when compressed under a final load of 1,275 N (130 kgf) from an initial load of 98 N (10 kgt).

In a still further preferred embodiment, letting CL1 be the coefficient of lift measured at a Reynolds number of 80,000 and a spin rate of 2,000 rpm and CL2 be the coefficient of lift measured at a Reynolds number of 70,000 and a spin rate of 1,900, CL1 and CL2 satisfy the condition:

$$0.900 \leq CL2/CL1.$$

In a yet further preferred embodiment, letting CL3 be the coefficient of lift measured at a Reynolds number of 200,000 and a spin rate of 2,500 rpm and CL4 be the coefficient of lift measured at a Reynolds number of 120,000 and a spin rate of 2,250, CL3 and CL4 satisfy the condition:

$$1.250 \leq CL4/CL3 \leq 1.300.$$

In another preferred embodiment, the core is a material molded under heat from a rubber composition which includes (A) a base rubber, (B) an organic peroxide, (C) water and/or a metal monocarboxylate and (D) sulfur.

In yet another preferred embodiment, components (C) and (D) have a weight ratio (D)/(C) therebetween which is from 0.02 to 0.20.

ADVANTAGEOUS EFFECTS OF THE INVENTION

The golf ball of the invention, which is designed for professional golfers and skilled amateurs, enables a superior distance to be achieved owing to the synergistic effects of a reduced spin rate and a high initial velocity on shots in the high head-speed range, and also has a good controllability in the short game and a high durability on repeated impact.

BRIEF DESCRIPTION OF THE DIAGRAMS

FIG. 3 is a graph showing the core hardness profiles in Examples 1 to 3.

FIG. 4 is a graph showing the core hardness profiles in Comparative Examples 1 to 3.

DESCRIPTION OF THE PREFERRED EMBODIMENTS

The objects, features and advantages of the invention will become more apparent from the following detailed description taken in conjunction with the appended diagrams.

Figure 1:
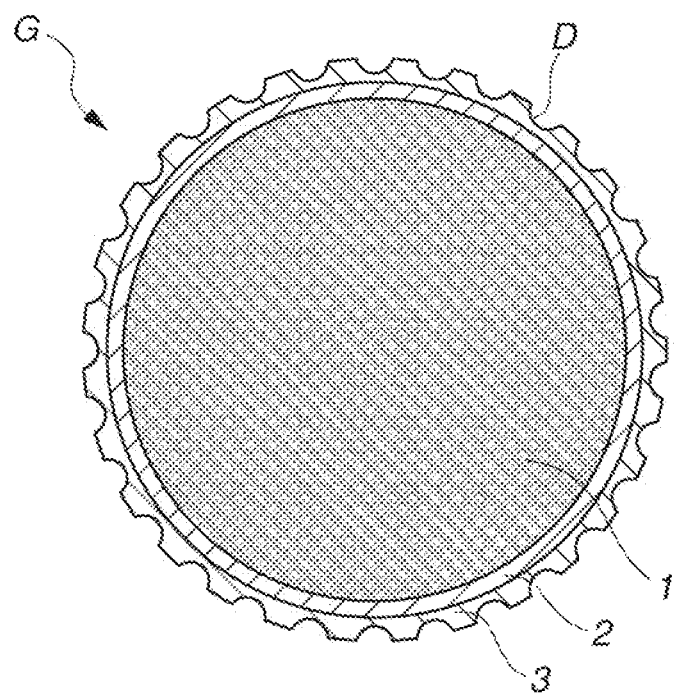
FIG. 1 is a schematic cross-sectional view of the golf ball according to one embodiment of the invention.

The multi-piece solid golf ball of the invention has a single-layer core, an intermediate layer and a cover. FIG. 1 shows an example of the inventive golf ball. The golf ball G shown in FIG. 1 has a single-layer core 1, a single-layer intermediate layer 2 encasing the core 1, and a single-layer cover 3 encasing the intermediate layer. The cover 3 is positioned as the outermost layer, excluding a coating layer, in the layered construction of the ball. The intermediate layer may be a single layer as shown in FIG. 1, or may be formed as a plurality of layers. Numerous dimples D are typically formed on the surface of the cover (outermost layer) 3 to enhance the aerodynamic properties of the ball. Although not shown in FIG. 1, a coating layer is generally formed on the surface of the cover 3. The layers are each described in detail below.

The core is composed primarily of a rubber material. Specifically, a core-forming rubber composition can be prepared by using a base rubber as the chief component and including together with this other ingredients such as a co-crosslinking agent, an organic peroxide, an inert filler and an organosulfur compound.

The core used in this invention is preferably a material molded under heat from a rubber composition which includes components (A) to (D) below:
(A) a base rubber,
(B) an organic peroxide,
(C) water and/or a metal monocarboxylate, and
(D) sulfur.

It is preferable to use polybutadiene as the base rubber (A). Commercial products may be used as the polybutadiene. Illustrative examples include BR01, BR51, BR730 and T0700 (JSR Corporation). The proportion of polybutadiene within the base rubber is preferably at least 60 wt %, and more preferably at least 80 wt %. Rubber ingredients other than the above polybutadienes may be included in the base rubber, provided that doing so does not detract from the advantageous effects of the invention. Examples of rubber ingredients other than the above polybutadienes include other polybutadienes and also other diene rubbers, such as styrene-butadiene rubbers, natural rubbers, isoprene rubbers and ethylene-propylene-diene rubbers.

It is suitable to use an organic peroxide having a relatively high thermal decomposition temperature as the organic peroxide (B). Organic peroxides having a high one-minute half-life temperature of between about 165° C. and about 185° C., such as dialkyl peroxides, may be used. Examples of dialkyl peroxides that may be suitably used include dicumyl peroxide (Percumyl D, from NOF Corporation), 2,5-dimethyl-2,5-di(t-butylperoxy)hexane (Perhexa 25B, from NOF Corporation) and di(2-t-butylperoxyisopropyl) benzene (Perbutyl P, from NOF Corporation). Preferred use can be made of dicumyl peroxide. These may be used singly or two or more may be used together. The half-life is one indicator representing the magnitude of the decomposition rate by the organic peroxide, and is expressed as the time required for the original organic peroxide to decompose and the amount of active oxygen therein to fall to one-half. The vulcanization temperature in the core-forming rubber composition is generally in a range of between 120° C. and 190° C.; within this range, an organic peroxide having a high one-minute half-life temperature of between about 165° C. and about 185° C. undergoes relatively slow thermal decomposition. Using the rubber composition of this invention, the core—a crosslinked rubber product having the subsequently described specific internal hardness profile—is obtained by adjusting the amount of free radical generation, which increases as the vulcanization time elapses.

The water (C) is not particularly limited, and may be distilled water or tap water. The use of distilled water that is free of impurities is especially preferred. The amount of water included per 100 parts by weight of the base rubber is preferably at least 0.1 part by weight, and more preferably at least 0.2 part by weight. The upper limit is preferably not more than 2 parts by weight, and more preferably not more than 1 part by weight.

Decomposition of the organic peroxide within the core formulation can be promoted by the direct addition of water or a water-containing material as component (C) to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water or a water-containing material is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

A metal monocarboxylate may be used instead of the above water. In metal monocarboxylates, the carboxylic acid is assumed to be coordination bonded to the metal atom, distinguishing these compounds from metal dicarboxylates such as zinc diacrylate of the chemical formula $[CH_2=CHCOO]_2Zn$. Because metal monocarboxylates furnish the rubber composition with water by way of a dehydrative condensation reaction, similar effects can be obtained as when water is used. Also, because metal monocarboxylates can be included in the rubber composition as a powder, the operations can be simplified and uniform dispersion in the rubber composition is easy. Effectively carrying out this reaction requires the use of a monosalt. The amount of metal monocarboxylate included per 100 parts by weight of the base rubber is preferably at least 1 part by weight, and more preferably at least 3 parts by weight. The upper limit is preferably not more than 60 parts by weight, and more preferably not more than 50 parts by weight. When too little metal monocarboxylate is included, it may be difficult to obtain a suitable crosslink density, which may make it impossible to obtain a sufficient golf ball spin rate-lowering effect. On the other hand, when too much is included, the core becomes too hard, as a result of which it may be difficult to retain a suitable feel at impact.

Examples of the carboxylic acid that may be used include acrylic acid, methacrylic acid, maleic acid, fumaric acid and stearic acid. Examples of the substituting metal include Na, K, Li, Zn, Cu, Mg, Ca, Co, Ni and Pb. Preferred use can be made of Zn. Specific examples of the metal monocarboxylate include zinc monoacrylate and zinc monomethacrylate. The use of zinc monoacrylate is especially preferred.

Specific examples of the sulfur (D) include Sanmix S-80N (available under this trade name from Sanshin Chemical Industry Co., Ltd.) and Sulfax-5 (from Tsurumi Chemical Industry Co., Ltd.). The amount of sulfur included per 100 parts by weight of the base rubber must be more than 0 parts by weight, and is preferably at least 0.005 part by weight, and more preferably at least 0.01 part by weight. Although there is no upper limit in the amount included, the amount is preferably set to not more than 0.1 part by weight, more preferably not more than 0.05 part by weight, and even more preferably not more than 0.03 part by weight. Adding sulfur makes it possible to increase hardness differences in the core. However, when too much sulfur is added, the rebound may undergo a large decrease or the durability on repeated impact may decrease.

The ratio in which components (C) and (D) are included, expressed as the weight ratio (D)/(C), is preferably at least 0.02, more preferably at least 0.03, and even more preferably at least 0.04. The upper limit is preferably not more than 0.20, more preferably not more than 0.16, and even more preferably not more than 0.12. Outside of this numerical range, it may be difficult to achieve the intended core hardness profile and it may be impossible to achieve both a superior distance on high head-speed shots with a driver (W #1) and a good durability to repeated impact. It should be noted that the amount of component (D) refers not to the weight of the sulfur product itself, but to the weight of the sulfur constituent included within the product.

In the rubber composition, in addition to the above-described components (A) to (D), it is possible to include also (E) a co-crosslinking agent and (F) an inert filler. An antioxidant and an organic sulfur compound may also be optionally included. These ingredients are described in detail below.

Examples of the co-crosslinking agent (E) include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Examples of metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically at least 5 parts by weight, preferably at least 9 parts by weight, and more preferably at least 13 parts by weight. The amount included is typically not more than 60 parts by weight, preferably not more than 50 parts by weight, and more preferably not more than 40 parts by weight. Too much may make the core too hard, giving the ball an unpleasant feel at impact, whereas too little may lower the rebound.

Examples of the inert filler (F) that may be suitably used include zinc oxide, barium sulfate and calcium carbonate. One of these may be used alone, or two or more may be used together. The amount of inert filler included per 100 parts by weight of the base rubber is preferably at least 1 part by weight, and more preferably at least 5 parts by weight. The upper limit is preferably not more than 50 parts by weight, more preferably not more than 40 parts by weight, and even more preferably not more than 36 parts by weight. Too much or too little inert filler may make it impossible to obtain a proper ball weight and a suitable rebound.

In addition, an antioxidant may be optionally included. Illustrative examples of suitable commercial antioxidants include Nocrac MB, Nocrac NS-6 and Nocrac NS-30 (available from Ouchi Shinko Chemical Industry Co., Ltd.), and Yoshinox 425 (available from Yoshitomi Pharmaceutical Industries, Ltd.). One of these may be used alone, or two or more may be used together.

The amount of antioxidant included per 100 parts by weight of the base rubber is set to preferably 0 part by weight or more, more preferably at least 0.05 part by weight, and even more preferably at least 0.1 part by weight. The upper limit is set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable ball rebound and durability.

An organosulfur compound may be included in the core in order to impart a good resilience. The organosulfur compound is not particularly limited, provided that it can enhance the rebound of the golf ball. Exemplary organosulfur compounds include thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of the zinc salt of pentachlorothiophenol is especially preferred.

It is recommended that the amount of organosulfur compound included per 100 parts by weight of the base rubber be preferably 0 part by weight or more, more preferably at least 0.05 part by weight, and even more preferably at least 0.1 part by weight, and that the upper limit be preferably not more than 5 parts by weight, more preferably not more than 3 parts by weight, and even more preferably not more than 2.5 parts by weight. Including too much organosulfur compound may make a greater rebound-improving effect (particularly on shots with a W #1) unlikely to be obtained, may make the core too soft or may worsen the feel of the ball at impact. On the other hand, including too little may make a rebound-improving effect unlikely.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

In this invention, the core is formed as a single layer. In the case of a multi-layer rubber core, separation at the interface may arise with repeated impact, worsening the durability.

The core has a diameter of from 35.5 to 39.5 mm, preferably at least 37.5 mm, and more preferably at least 38.3 mm. The upper limit is preferably not more than 39.2 mm, and more preferably not more than 38.8 mm. When the core diameter is too small, the initial velocity on full shots may decrease, resulting in a poor distance, or the feel at impact may worsen. On the other hand, when the core diameter is too large, the durability to cracking on repeated impact may decrease.

The core has a deflection when compressed under a final load of 1,275 N (130 kgf) from an initial load of 98 N (10 kgf) which, although not particularly limited, is preferably at least 2.5 mm, more preferably at least 2.7 mm, and even more preferably at least 2.9 mm. The upper limit is preferably not more than 3.5 mm, more preferably not more than 3.4 mm, and even more preferably not more than 3.3 mm. When the core deflection is too small, i.e., when the core is too hard, the spin rate of the ball may rise excessively and so the intended distance may not be achieved, or the feel at impact may become too hard. On the other hand, when the core deflection is too large, i.e., when the core is too soft, the initial velocity of the ball on shots may decrease and the intended distance may not be achieved, the feel at impact may become too soft, or the durability of the ball to cracking on repeated impact may worsen.

Next, the hardness profile of the core is described. The core hardnesses mentioned below are Shore C hardnesses. These are hardness values measured with a Shore C durometer in accordance with ASTM D2240.

In the following explanation of the core hardness profile, H100 is defined as the Shore C hardness at the core surface, H87.5 as the Shore C hardness at a position 87.5% of the core radius outward from the core center, H75 as the Shore C hardness at a position 75% of the core radius outward from the core center, H62.5 as the Shore C hardness at a position 62.5% of the core radius outward from the core center, H50 as the Shore C hardness at a position 50% of the core radius outward from the core center, H37.5 as the Shore C hardness at a position 37.5% of the core radius outward from the core center, H25 as the Shore C hardness at a position 25% of the core radius outward from the core center, H12.5 as the Shore C hardness at a position 12.5% of the core radius outward from the core center and H0 as the Shore C hardness at the core center.

The surface hardness of the core (H100), although not particularly limited, is preferably at least 83, more preferably at least 85, and even more preferably at least 87, and is preferably not more than 94, more preferably not more than 92, and even more preferably not more than 90. When this value is too small, the rebound may decrease and the flight performance may worsen, or the durability of the ball to cracking on repeated impact may worsen. On the other hand, when this value is too large, the feel of the ball may become harder, or the spin rate on full shots may rise, as a result of which the intended distance may not be obtained.

The hardness at a position 87.5% of the core radius outward from the core center (H87.5), although not particularly limited, is preferably at least 82, more preferably at least 84, and even more preferably at least 86, and is preferably not more than 92, more preferably not more than 90, and even more preferably not more than 88. A value outside of these hardnesses may lead to disadvantageous results similar to those described above for the surface hardness of the core (H100).

The hardness at a position 75% of the core radius outward from the core center (H75), although not particularly limited, is preferably at least 71, more preferably at least 73, and even more preferably at least 75 and is preferably not more than 83, more preferably not more than 81, and even more preferably not more than 79. A value outside of these hardnesses may lead to disadvantageous results similar to those described above for the surface hardness of the core (H100).

The hardness at a position 62.5% of the core radius outward from the core center (H62.5), although not particularly limited, is preferably at least 65, more preferably at least 67, and even more preferably at least 69, and is preferably not more than 76, more preferably not more than 74, and even more preferably not more than 72. A value outside of these hardnesses may lead to disadvantageous results similar to those described above for the surface hardness of the core (H100).

The hardness at a position 50% of the core radius outward from the core center (H50), although not particularly limited, is preferably at least 65, more preferably at least 67, and even more preferably at least 69, and is preferably not more than 76, more preferably not more than 74, and even more preferably not more than 72. A value outside of these hardnesses may lead to disadvantageous results similar to those described above for the surface hardness of the core (H100).

The hardness at a position 37.5% of the core radius outward from the core center (H37.5), although not particularly limited, is preferably at least 65, more preferably at least 67, and even more preferably at least 70, and is preferably not more than 76, more preferably not more than 74, and even more preferably not more than 73. A value outside of these hardnesses may lead to disadvantageous results similar to those described above for the surface hardness of the core (H100).

The hardness at a position 25% of the core radius outward from the core center (H25), although not particularly limited, is preferably at least 66, more preferably at least 68, and even more preferably at least 70, and is preferably not more than 76, more preferably not more than 74, and even more preferably not more than 72. A value outside of these hardnesses may lead to disadvantageous results similar to those described above for the surface hardness of the core (H100).

The hardness at a position 12.5% of the core radius outward from the core center (H12.5), although not particularly limited, is preferably at least 64, more preferably at least 66, and even more preferably at least 68, and is preferably not more than 74, more preferably not more than 72, and even more preferably not more than 70. A value outside of these hardnesses may lead to disadvantageous results similar to those described above for the surface hardness of the core (H100).

The hardness at the core center (H0), although not particularly limited, is preferably at least 62, more preferably at least 64, and even more preferably at least 66, and is preferably not more than 72, more preferably not more than 70, and even more preferably not more than 68. A value outside of these hardnesses may lead to disadvantageous results similar to those described above for the surface hardness of the core (H100).

It is critical for the core used in the invention to satisfy the following condition:

$$(H75-H50)>(H25-H0)>(H100-H87.5)>(H50-H25)$$

When this condition is not satisfied, the spin rate on full shots rises or the initial velocity on shots decreases, as a result of which the intended distance is not achieved, or the durability to cracking on repeated impact worsens.

The value of (H75–H50) in the above expression is preferably at least 4.0, more preferably at least 4.3, and even more preferably at least 4.5. The upper limit is preferably not more than 9.0, more preferably not more than 8.5, and even more preferably not more than 8.0. When this value is too large, the durability to cracking on repeated impact may worsen. On the other hand, when this value is too small, the spin rate on full shots may increase and a good distance may not be achieved.

The value of (H25–H0) in the above expression is preferably at least 3.0, more preferably at least 3.2, and even more preferably at least 3.4. The upper limit is preferably not more than 6.0, more preferably not more than 5.0, and even more preferably not more than 4.5. Outside of this range, the spin rate on full shots may increase and a good distance may not be achieved, or the durability to cracking on repeated impact may worsen.

The value of (H100–H87.5) in the above expression is preferably at least 0, more preferably at least 0.3, and even more preferably at least 0.5. The upper limit is preferably not more than 3.0, more preferably not more than 2.5, and even more preferably not more than 2.0. When this value is too large, the durability to cracking on repeated impact may worsen. On the other hand, when this value is too small, the spin rate on full shots may increase and a good distance may not be achieved.

The value of (H50–H25) in the above expression is preferably −1.0 or more, more preferably −0.6 or more, and even more preferably −0.2 or more. The upper limit is preferably not more than 1.0, more preferably not more than 0.6, and even more preferably not more than 0.2. Outside of this range, the spin rate on full shots may increase and a good distance may not be obtained.

The value of (H75–H50)−(H25–H0) in the above expression is preferably more than 0, more preferably at least 0.3, and even more preferably at least 0.6. The upper limit is preferably not more than 7.0, more preferably not more than 5.0, and even more preferably not more than 3.1. Outside of this range, it may be impossible to achieve both a reduced spin rate on full shots at high head speeds and a good durability to cracking on repeated impact.

The value of (H25–H0)−(H100–H87.5) in the above expression is preferably more than 0, more preferably at least 1.0, and even more preferably at least 1.8. The upper limit is preferably not more than 8.0, more preferably not more than 6.0, and even more preferably not more than 4.1.

A value outside of this range may lead to disadvantageous results similar to those described above for the value of (H75−H50)−(H25−H0).

The value of (H100−H87.5)−(H50−H25) in the above expression is preferably more than 0, more preferably at least 0.3, and even more preferably at least 0.6. The upper limit is preferably not more than 6.0, more preferably not more than 4.0, and even more preferably not more than 1.8. A value outside of this range may lead to disadvantageous results similar to those described above for the value of (H75−H50)−(H25−H0).

It is also critical for the core used in the invention to satisfy the following condition:

$$23.0 \geq (H87.5 - H0) \geq 17.0$$

The value of (H87.5−H0) in this expression is at least 17.0, preferably at least 18.0, and more preferably at least 19.0. The upper limit is not more than 23.0, preferably not more than 22.0, and more preferably not more than 21.0. When this value is too large, the durability to cracking on repeated impact worsens. When it is too small, the spin rate on full shots increases and a good distance is not achieved.

In addition, it is critical for the core used in this invention to satisfy the following condition:

$$\text{absolute value of } (H87.5-H0)/(H50-H0) \geq 3.0$$

That is, the absolute value of (H87.5−H0)/(H50−H0) is at least 3.0, preferably at least 3.5, and more preferably at least 4.0. The upper limit is preferably not more than 8.0, more preferably not more than 7.0, and even more preferably not more than 6.0. When this value is too large, the durability to cracking on repeated impact may worsen, or the initial velocity on full shots may decrease, as a result of which the intended distance may not be achieved. On the other hand, when this value is too small, the spin rate on full shots rises and so the intended distance cannot be achieved.

It is preferable for the hardness profile of the core used in this invention to also satisfy the following condition. Namely, the hardness difference between the core surface and center, expressed as the value (H100−H0), is preferably at least 18.0, more preferably at least 19.0, and even more preferably at least 20.0. The upper limit is preferably not more than 30.0, more preferably not more than 26.0, and even more preferably not more than 23.0. When this value is too large, the durability to cracking on repeated impact may worsen. On the other hand, when this value is too small, the spin rate on full shots may increase and a good distance may not be achieved.

Next, the intermediate layer is described. The intermediate layer is formed as a single layer or as a plurality of layers. As described below, it is preferable for each such layer to be formed of a resin material.

The intermediate layer has a material hardness on the Shore D hardness scale which, although not particularly limited, is preferably at least 60, more preferably at least 62, and even more preferably at least 64. The upper limit is preferably not more than 72, more preferably not more than 70, and even more preferably not more than 68. The surface hardness of the sphere obtained by encasing the core with the intermediate layer (intermediate layer-encased sphere), expressed on the Shore D hardness scale, is preferably at least 66, more preferably at least 68, and even more preferably at least 70. The upper limit is preferably not more than 78, more preferably not more than 76, and even more preferably not more than 74. When the intermediate layer material hardness and surface hardness are lower than the above ranges, the spin rate on full shots may rise excessively and a good distance may not be achieved, or the initial velocity of the ball may be low, as a result of which a good distance may not be achieved on full shots. On the other hand, when the material hardness and surface hardness are too high, the durability to cracking on repeated impact may worsen or the feel on impact may worsen.

The intermediate layer has a material hardness on the Shore C hardness scale which is preferably at least 88, more preferably at least 89, and even more preferably at least 92. The upper limit value is preferably not more than 98, more preferably not more than 96, and even more preferably not more than 94. The intermediate layer-encased sphere has a surface hardness on the Shore C hardness scale which is preferably at least 92, more preferably at least 94, and even more preferably at least 96. The upper limit value is preferably not more than 100, more preferably not more than 99, and even more preferably not more than 98.

The intermediate layer has a thickness which is preferably at least 0.90 mm, more preferably at least 1.10 mm, and even more preferably at least 1.15 mm. The upper limit is preferably not more than 1.50 mm, more preferably not more than 1.35 mm, and even more preferably not more than 1.25 mm. When the intermediate layer is too thin, the durability to cracking on repeated impact may worsen, or the spin rate on full shots with an iron may rise and a good distance may not be achieved. On the other hand, when the intermediate layer is too thick, the initial velocity on shots may decrease and the intended distance may not be achieved, or the feel at impact may worsen.

Various thermoplastic resins used as golf ball materials, particularly resin materials composed primarily of an ionomer resin, can be employed as the intermediate layer material.

It is preferable for the ionomer resin material to include a high-acid ionomer. For example, the ionomer resin material may be one obtained by blending with an ordinary ionomer resin and using, of commercially available ionomer resins, a high-acid ionomer resin having an acid content of at least 16 wt %. With this blend, a lower spin rate and a higher rebound are both achieved on full shots with a driver (W #1), enabling the intended distance to be achieved.

The amount of unsaturated carboxylic acid included in the high-acid ionomer resin (acid content) is generally at least 16 wt %, preferably at least 17 wt %, and more preferably at least 18 wt %. The upper limit is preferably not more than 22 wt %, more preferably not more than 21 wt %, and even more preferably not more than 20 wt %. When this value is too small, the spin rate on full shots with a driver (W #1), a utility club or an iron may rise, as a result of which the intended distance may not be attainable. On the other hand, when this value is too large, the feel at impact may become too hard or the durability to cracking on repeated impact may worsen.

The amount of high-acid ionomer resin included per 100 wt % of the resin material is preferably at least 20 wt %, more preferably at least 50 wt %, and even more preferably at least 60 wt %. The upper limit is 100 wt % or less, preferably 90 wt % or less, and more preferably 85 wt/o or less. When the amount of the above high-acid ionomer resin included is too low, the spin rate on full shots may rise and a good distance may not be achieved. On the other hand, when the amount of high-acid ionomer resin included is too high, the durability to repeated impact may worsen.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is generally less than 1.1, preferably from 0.90 to 1.05, and more preferably from 0.93 to 0.99. Outside of this range, the rebound of the overall ball may decrease and a good distance may not be achieved, or the durability to cracking on repeated impact may worsen.

Next, the cover, which serves as the outermost layer, is described.

The cover has a material hardness on the Shore D hardness scale which, although not particularly limited, is preferably at least 35, more preferably at least 40, and even more preferably at least 45. The upper limit is preferably not more than 60, more preferably not more than 55, and even more preferably not more than 50. The surface hardness of the sphere obtained by encasing the intermediate layer-encased sphere with the cover (i.e., the ball surface hardness), expressed on the Shore D hardness scale, is preferably at least 50, more preferably at least 53, and even more preferably at least 56. The upper limit is preferably not more than 70, more preferably not more than 67, and even more preferably not more than 64. When the material hardness of the cover and the ball surface hardness are lower than the respective above ranges, the spin rate of the ball on full shots may rise and a good distance may not be achieved under any hitting conditions. On the other hand, when the material hardness of the cover and the ball surface hardness are higher than the above ranges, the ball may not be sufficiently receptive to spin on approach shots or the scuff resistance may worsen.

The cover has a material hardness on the Shore C hardness scale which is preferably at least 57, more preferably at least 63, and even more preferably at least 70. The upper limit value is preferably not more than 89, more preferably not more than 83, and even more preferably not more than 76. The surface hardness of the ball, expressed on the Shore C hardness scale, is preferably at least 75, more preferably at least 80, and even more preferably at least 85. The upper limit value is preferably not more than 95, more preferably not more than 92, and even more preferably not more than 90.

The cover has a thickness of preferably at least 0.3 mm, more preferably at least 0.45 mm, and even more preferably at least 0.6 mm. The upper limit in the cover thickness is preferably not more than 1.2 mm, more preferably not more than 1.15 mm, and even more preferably not more than 1.0 mm. When the cover is too thick, the rebound on full shots with an iron may be inadequate or the spin rate may rise, as a result of which a good distance may not be achieved. On the other hand, when the cover is too thin, the scuff resistance may worsen or the ball may not be fully receptive to spin on approach shots and may thus lack sufficient controllability.

The combined thickness of the cover and the intermediate layer is preferably at least 1.4 mm, more preferably at least 1.7 mm, and even more preferably at least 2.0 mm. The upper limit of this combined thickness is preferably not more than 2.8 mm, more preferably not more than 2.5 mm, and even more preferably not more than 2.3 mm. When the combined thickness is too small, the durability of the ball to cracking on repeated impact may worsen. On the other hand, when the combined thickness is too large, the spin rate on full shots may rise and a good distance may not be achieved.

Various types of thermoplastic resins used in golf ball cover stock may be employed as the cover material. For reasons having to do with spin controllability in the short game and the scuff resistance, the use of a resin material made up largely of a thermoplastic polyurethane is preferred. That is, it is preferable to form the cover of a resin blend in which the chief components are (1) a thermoplastic polyurethane and (II) a polyisocyanate compound.

It is recommended that components (1) and (11) have a combined weight of at least 60%, and preferably at least 70%, of the overall amount of the cover-forming resin composition. Components (I) and (II) are described in detail below.

The thermoplastic polyurethane (I) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having from 2 to 12 carbon atoms, and is more preferably 1,4-butylene glycol.

Any polyisocyanate compound hitherto employed in the art relating to thermoplastic polyurethanes may be suitably used without particular limitation as the polyisocyanate compound. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (I). Illustrative examples include Pandex T-8295, Pandex T-8290 and Pandex T-8260 (all from DIC Covestro Polymer, Ltd.).

A thermoplastic elastomer other than the above thermoplastic polyurethanes may also be optionally included as a separate component, i.e., component (III), together with above components (I) and (II). By including this component (III) in the above resin blend, the flowability of the resin blend can be further improved and the properties required of a golf ball cover material, such as resilience and scuff resistance, can be increased.

The compositional ratio of components (I), (II) and (III) is not particularly limited. However, to fully elicit the advantageous effects of the invention, the compositional ratio (I):(II):(III) is preferably in the weight ratio range of from 100:2:50 to 100:50:0, and is more preferably from 100:2:50 to 100:30:8.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The manufacture of golf balls in which the above-described core, intermediate layer and cover (outermost layer) are formed as successive layers may be carried out in the usual manner, such as by a known injection molding process. For example, a golf ball can be produced by injection-molding the intermediate layer material over the core in an injection mold so as to obtain an intermediate layer-encased sphere, and then injection-molding the material for the cover serving as the outermost layer over the intermediate layer-encased sphere. Alternatively, the encasing layers may each be formed by enclosing the sphere to be encased within two pre-molded hemispherical half-cups and then molding under applied heat and pressure.

The golf ball has a deflection when compressed under a final load of 1,275 N (130 kgf) from an initial load of 98 N (10 kgf) which is preferably at least 2.1 mm, more preferably at least 2.2 mm, and even more preferably at least 2.4 mm. The upper limit value is preferably not more than 2.8 mm, more preferably not more than 2.7 mm, and even more preferably not more than 2.6 mm. When the golf ball deflection is too small, i.e., when the ball is too hard, the spin rate may rise excessively or the feel at impact may be too hard. On the other hand, when the deflection is too large, i.e., when the ball is too soft, the durability to cracking on repeated impact may worsen or the initial velocity on shots may be low, as a result of which a good distance may not be achieved on shots with a driver (W #1).

Hardness Relationships Among Layers

The intermediate layer-encased sphere has a higher surface hardness than the core, the difference between these surface hardnesses on the Shore C hardness scale being preferably at least 1, more preferably at least 4, and even more preferably at least 8. The upper limit value is preferably not more than 20, more preferably not more than 15, and even more preferably not more than 12. When this value is too small, the spin rate on full shots may rise and a good distance may not be achieved. When this value is too large, the durability to cracking on repeated impact may worsen.

The intermediate layer-encased sphere has a higher surface hardness than the ball, the difference between these surface hardnesses on the Shore C hardness scale being preferably at least 1, more preferably at least 5, and even more preferably at least 9. The upper limit value is preferably not more than 20, more preferably not more than 17, and even more preferably not more than 15. When this value is small, in cases where this small value is attributable to the material hardness of the intermediate layer, the spin rate on full shots may rise and the intended distance may not be achieved. In cases where this small value is attributable to the material hardness of the cover, the spin controllability in the short game may worsen or the scuff resistance may worsen. On the other hand, when this value is large, in cases where this large value is attributable to the material hardness of the intermediate layer, the durability to cracking on repeated impact may worsen or the feel at impact may become too hard. In cases where this large value is attributable to the material hardness of the cover, the spin rate on full shots may rise and the intended distance may not be achieved.

Deflection Relationship Between Core and Ball

Letting E (mm) be the deflection of the core when compressed under a final load of 1,275 N (130 kgf) from an initial load of 98 N (10 kgf) and B (mm) be the deflection of the ball when compressed under a final load of 1,275 N (130 kgf) from an initial load of 98 N (10 kgf), the value E-B is preferably at least 0.3 mm, more preferably at least 0.5 mm, and even more preferably at least 0.6 mm; the upper limit is preferably not more than 1.2 mm, more preferably not more than 1.0 mm, and even more preferably not more than 0.8 mm. When this value is too small, the spin rate on full shots may rise and a good distance may not be achieved. On the other hand, when this value is too large, the durability to cracking on repeated impact may worsen or the run of the ball on iron shots may be too long.

The difference in deflection between the ball and the core, expressed as the value B/E, is preferably at least 0.70, more preferably at least 0.73, and even more preferably at least 0.78. The upper limit is preferably not more than 0.84, more preferably not more than 0.82, and even more preferably not more than 0.80. When this value is too small, the durability to cracking on repeated impact may worsen or the run of the ball on iron shots may be too long. On the other hand, when this value is too large, the spin rate on full shots may rise and the intended distance may not be achieved.

Numerous dimples may be formed on the outside surface of the cover. The number of dimples arranged on the cover surface, although not particularly limited, is preferably at least 323, more preferably at least 326, and even more preferably at least 330. The upper limit is preferably not more than 380, more preferably not more than 360, and even more preferably not more than 350. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of the dimple, as a percentage of the spherical surface area of the ball were the ball to have no dimples thereon, to be set to at least 70% and not more than 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may fail to travel a fully satisfactory distance.

It is desirable for the golf ball of the invention to optimize the ratios CL2/CL1 and CL4/CL3, where CL1 is the coefficient of lift at a Reynolds number of 80,000 and a spin rate of 2,000 rpm, CL2 is the coefficient of lift at a Reynolds number of 70,000 and a spin rate of 1,900 rpm, CL3 is the coefficient of lift at a Reynolds number of 200,000 and a spin rate of 2,500 rpm and CL4 is the coefficient of lift at a Reynolds number of 120,000 and a spin rate of 2,250 rpm.

In this Specification, the coefficients of lift (CL1, CL2, CL3 and CL4) are measured in conformity with the Indoor Test Range (ITR) method established by the United States Golf Association (USGA). The coefficient of lift can be adjusted by adjusting the golf ball dimple configuration (arrangement, diameter, depth, volume, number, shape, etc.). The coefficient of lift does not depend on the internal construction of the golf ball. The Reynolds number (Re) is a dimensionless number used in the field of fluid dynamics, and is calculated using formula (I) below.

$$Re = \rho v L/\mu \qquad (I)$$

In formula (I), $\rho$ represents the density of a fluid, v is the average velocity of an object relative to flow by the fluid, L is a characteristic length, and $\mu$ is the coefficient of viscosity of the fluid.

The conditions under which the coefficient of lift CL1 is measured, i.e., a Reynolds number of 80,000 and a spin rate of 2,000 rpm, generally correspond approximately to the state at the time that the coefficient of lift begins to decrease and, in turn, the golf ball begins to fall after having reached its highest point following launch. The conditions under which the coefficient of lift CL2 is measured, i.e., a Reynolds number of 70,000 and a spin rate of 1,900 rpm, generally correspond approximately to the state just before the golf ball falls to the ground after having reached its highest point following launch. The above are particularly true in cases where the golf ball is launched under high-velocity conditions (e.g., an initial velocity of 66 m/s, a spin rate of 2,600 rpm, and a launch angle of 11°). These high-velocity conditions generally correspond to the launch conditions when the ball is hit with a driver by an amateur golfer.

The ratio CL2/CL1 has a value of preferably at least 0.900, more preferably at least 0.970, and even more preferably at least 0.990. By satisfying the above range, the decrease in lift as the golf ball falls can be suppressed, which in turn makes it easier for the flight distance (i.e., the carry) to be extended as the ball falls and for the run to be extended. Hence, the total distance can be increased. When CL2/CL1 is too low, the golf ball tends to fall more abruptly, making it difficult to satisfactorily increase the carry and run. A higher CL2/CL is better from the standpoint of increasing the total distance. However, when this value is too high, the carry is extended but the run decreases, as a result of which the total distance may not exceed the optimal value. Therefore, the upper limit value for CL2/CL1 is 1.100 or less, and preferably 1.018 or less.

The conditions under which the coefficient of lift CL3 is measured, i.e. a Reynolds number of 200,000 and a spin rate of 2,500 rpm, generally correspond approximately to the state just after the golf ball has been launched under high-velocity conditions (e.g., an initial velocity of 72 m/s, a spin rate of 2,500 rpm and a launch angle of 10°). The conditions under which the coefficient of lift CL4 is measured, i.e. a Reynolds number of 120,000 and a spin rate of 2,250 rpm, generally correspond approximately to the state when approximately 2 seconds have elapsed as the ball rises after being launched under high-velocity conditions (e.g., an initial velocity of 72 m/s, a spin rate of 2,500 rpm and a launch angle of 10°).

The ratio CL4/CL3 has a value of preferably at least 1.250, more preferably at least 1.252, and even more preferably at least 1.255. The upper limit is preferably not more than 1.300, more preferably not more than 1.295, and even more preferably not more than 1.290. By setting the ratio in this range, when the golf ball has been launched under high-velocity conditions set in the above range (e.g., when hit with a driver), the amount of rise by the golf ball can be kept from becoming excessive (i.e., the ball can be kept from climbing too steeply), making it possible to increase the resistance of the ball to wind and thus enabling the carry to be increased. In addition, the run can be increased. This enables the total distance traveled by the ball to be increased.

From the standpoint of increasing the distance traveled by the ball, the coefficient of lift CL1 is preferably at least 0.230; CL1 is also preferably not more than 0.240. From the same standpoint, the coefficient of lift CL2 is preferably at least 0.230; CL2 is also preferably not more than 0.240. From the same standpoint, the coefficient of lift CL3 is preferably at least 0.145; CL3 is also preferably not more than 0.155. From the same standpoint, the coefficient of lift CL4 is preferably at least 0.185; CL4 is also preferably not more than 0.195.

A coating layer is formed on the surface of the cover. This coating layer can be formed by applying various types of coating materials. Because the coating layer must be capable of enduring the harsh conditions of golf ball use, it is desirable to use a coating composition in which the chief component is a urethane coating material composed of a polyol and a polyisocyanate.

The polyol component is exemplified by acrylic polyols and polyester polyols. These polyols include modified polyols. To further increase workability, other polyols may also be added.

The acrylic polyol is exemplified by homopolymers and copolymers of monomers having functional groups that react with isocyanate. Such monomers are exemplified by alkyl esters of (meth)acrylic acid, illustrative examples of which include methyl (meth)acrylate, ethyl (meth)acrylate, isopropyl (meth)acrylate, butyl (meth)acrylate, isobutyl (meth)acrylate, 2-ethylhexyl (meth)acrylate, lauryl (meth)acrylate, stearyl (meth)acrylate, cyclohexyl (meth)acrylate, isobornyl (meth)acrylate, 2-hydroxyethyl (meth)acrylate, 2-hydroxypropyl (meth)acrylate and 4-hydroxybutyl (meth)acrylate. These may be used singly or two or more may be used together.

Modified acrylic polyols that may be used include polyester-modified acrylic polyols. Examples of other polyols include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PH2A); lactone-type polyester polyols such as poly-ε-caprolactone (PCL); and polycarbonate polyols such as polyhexamethylene carbonate. These may be used singly or two or more may be used together. The ratio of these polyols to the total amount of acrylic polyol is preferably not more than 50 wt %, and more preferably not more than 40 wt %.

Polyester polyols are obtained by the polycondensation of a polyol with a polybasic acid. Examples of the polyol include diols such as ethylene glycol, 1,2-propanediol, 1,3-propanediol, 1,3-butanediol, 1,4-butanediol, 1,6-hexanediol, neopentyl glycol, diethylene glycol, dipropylene glycol, hexylene glycol, dimethylol heptane, polyethylene glycol and polypropylene glycol; and also triols, tetraols, and polyols having an alicyclic structure. Examples of the polybasic acid include aliphatic dicarboxylic acids such as succinic acid, adipic acid, sebacic acid, azelaic acid and dimer acid; aliphatic unsaturated dicarboxylic acids such as fumaric acid, maleic acid, itaconic acid and citraconic acid; aromatic polycarboxylic acids such as phthalic acid, isophthalic acid, terephthalic acid, trimellitic acid and pyromellitic acid; dicarboxylic acids having an alicyclic structure, such as tetrahydrophthalic acid, hexahydrophthalic acid, 1,3-cyclohexanedicarboxylic acid, 1,4-cyclohexanedicarboxylic acid and endomethylene tetrahydrophthalic acid; and tris-2-carboxyethyl isocyanurate.

It is suitable to use two types of polyester polyol together as the polyol component. Letting the two types of polyester polyol be component A and component B, a polyester polyol in which a cyclic structure has been introduced onto the resin skeleton may be used as the polyester polyol of component A. Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a multibranched structure may be used as the polyester polyol of component B. Examples include polyester polyols having a branched structure, such as NIPPOLAN 800 from Tosoh Corporation.

The weight-average molecular weight (Mw) of the overall base resin consisting of the above two types of polyester polyol is preferably from 13,000 to 23,000, and more preferably from 15,000 to 22,000. The number-average molecular weight (Mn) of the overall base resin consisting of these two types of polyester polyols is preferably from 1,100 to 2,000, and more preferably from 1,300 to 1,850. Outside of these ranges in the average molecular weights (Mw and Mn), the wear resistance of the coating layer may decrease. The weight-average molecular weight (Mw) and the number-average molecular weight (Mn) are polystyrene-equivalent measured values obtained by gel permeation chromatography (GPC) using differential refractometry.

The contents of these two types of polyester polyol (components A and B) are not particularly limited, although the content of component A is preferably from 20 to 30 wt/o of the total amount of the base resin and the content of component B is preferably from 2 to 18 wt % of the total amount of the base resin.

The polyisocyanate is exemplified, without particular limitation, by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Modified forms of hexamethylene diisocyanate include, for example, polyester-modified hexamethylene diisocyanate and urethane-modified hexamethylene diisocyanate. Derivatives of hexamethylene diisocyanate include isocyanurates, biurets and adducts of hexamethylene diisocyanate.

The molar ratio of isocyanate (NCO) groups on the polyisocyanate to hydroxyl (OH) groups on the polyol, expressed as NCO/OH, is preferably in the range of 0.5 to 1.5, more preferably from 0.8 to 1.2, and even more preferably from 1.0 to 1.2. At less than 0.5, unreacted hydroxyl groups remain, which may adversely affect the performance and water resistance of the coating layer. On the other hand, at above 1.5, the number of isocyanate groups becomes excessive and urea groups (which are fragile) form in reactions with moisture, as a result of which the performance of the coating layer may decline.

An amine catalyst or an organometallic catalyst may be used as the curing catalyst (organometallic compound). Examples of the organometallic compound include soaps of metals such as aluminum, nickel, zinc or tin. Preferred use can be made of such compounds which have hitherto been included as curing agents for two-part curing urethane coatings.

Depending on the coating conditions, various types of organic solvents may be mixed into the coating composition. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether, alicyclic hydrocarbon solvents such as cyclohexane, methyl cyclohexane and ethyl cyclohexane; and petroleum hydrocarbon solvents such as mineral spirits.

Known coating ingredients may be optionally added to the coating composition. For example, thickeners, ultraviolet absorbers, fluorescent brighteners, slip agents and pigments may be included in suitable amounts.

The thickness of the coating layer made of the coating composition, although not particularly limited, is typically from 5 to 40 μm, and preferably from 10 to 20 μm. As used herein, "coating layer thickness" refers not to the coating layer formed within the dimples, but to the thickness of the coating formed on the ball surface outside of the dimples (also referred to as the "lands").

In this invention, the coating layer made of the above coating composition has an elastic work recovery that is preferably at least 60%, more preferably at least 70%, and even more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, and so it is thought that the physical properties of the coating layer can be precisely evaluated. Given that the coating layer on the ball surface is strongly affected by the impact of the driver and various other types of clubs and has a not inconsiderable influence on the golf ball properties, measuring the coating layer by the nanohardness test method and carrying out such measurement to a higher precision than in the past is a very effective method of evaluation.

cation, applying the composition onto the golf ball surface by a conventional coating operation, and drying the applied composition. The coating method is not particularly limited. For example, spray painting, electrostatic painting or dipping may be suitably used.

EXAMPLES

The following Examples and Comparative Examples are provided to illustrate the invention, and are not intended to limit the scope thereof.

Examples 1 to 3, Comparative Examples 1 to 8

Formation of Core

Solid cores were produced by preparing rubber compositions for Examples 1 to 3 and Comparative Examples 1 to 6 shown in Table 1 and then vulcanizing the compositions under the temperature and time conditions shown in Table 1.

In Comparative Examples 7 and 8, solid cores are produced in the same way as above using the compositions and vulcanization conditions shown in Table 1.

TABLE 1

| | Formulation (pbw) | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| (A) | Polybutadiene A | | | | | 100 | | | 100 | | | |
| | Polybutadiene B | 100 | 100 | 100 | 100 | | 100 | 100 | | 100 | | |
| | Polybutadiene C | | | | | | | | | | 98 | 100 |
| | Isoprene rubber | | | | | | | | | | 2 | |
| — | Zinc acrylate | 33.5 | 33.5 | 30.0 | 32.0 | 31.5 | 31.5 | 31.5 | 33.0 | 33.3 | 36.8 | 27.5 |
| (B) | Organic peroxide (1) | 1.0 | 0.8 | 1.0 | 1.0 | 1.0 | 0.8 | 1.0 | 1.0 | 1.0 | | |
| | Organic peroxide (2) | | | | | | | | | | 3.0 | 3.0 |
| — | Zinc stearate | | | | | | | | | | 5.0 | 5.0 |
| (D) | Sulfur (1) | 0.03 | 0.03 | 0.01 | 0.03 | 0.01 | 0.01 | 0.01 | 0.01 | | | |
| | Sulfur (2) | | | | | | | | | | 0.1 | |
| (C) | Water | 0.2 | 0.2 | 0.2 | 0.2 | 0.2 | 0.2 | 0.2 | 0.2 | 0.4 | | |
| — | Antioxidant A | 0.1 | | | | | | 0.1 | 0.1 | 0.1 | | 0.1 |
| — | Antioxidant B | | 0.3 | 0.3 | 0.3 | 0.3 | 0.3 | | | | | |
| — | Zinc oxide | 17.2 | 16.7 | 18.6 | 18.2 | 18.0 | 18.1 | 18.2 | 17.3 | 17.2 | 15.5 | 19.5 |
| — | Zinc salt of pentachlorothiophenol | 0.1 | 0.1 | 0.1 | 0.1 | 0.3 | 0.1 | 0.1 | 0.3 | 0.3 | 0.1 | 0.1 |
| (D) Sulfur component/(C) (weight ratio) | | 0.12 | 0.12 | 0.04 | 0.12 | 0.04 | 0.04 | 0.04 | 0.04 | 0 | — | 0 |
| Vulcanization conditions | Temperature | 148 | 148 | 148 | 148 | 148 | 148 | 148 | 148 | 145 | 155 | 155 |
| | Time | 19 | 19 | 19 | 19 | 19 | 19 | 19 | 19 | 19 | 20 | 15 |

The hardness of the coating layer, as expressed on the Shore M hardness scale, is preferably at least 40, and more preferably at least 60. The upper limit is preferably not more than 95, and more preferably not more than 85. This Shore M hardness is obtained in accordance with ASTM D2240. The hardness of the coating layer, as expressed on the Shore C hardness scale, is preferably at least 40 and has an upper limit of preferably not more than 80. This Shore C hardness is obtained in accordance with ASTM D2240. At coating layer hardnesses that are higher than these ranges, the coating may become brittle when the ball is repeatedly struck, which may make it incapable of protecting the cover layer. On the other hand, coating layer hardnesses that are lower than the above range are undesirable because the ball surface may be more easily damaged when striking a hard object and mud may stick more readily to the ball.

When the above coating composition is used, the formation of a coating layer on the surface of golf balls manufactured by a known method can be carried out via the steps of preparing the coating composition at the time of appli- Details on the ingredients mentioned in Table 1 are given below.

Polybutadiene A: Available under the trade name "BR 01" from JSR Corporation

Polybutadiene B: Available under the trade name "T0700" from JSR Corporation

Polybutadiene C: Available under the trade name "BR 730" from JSR Corporation

Isoprene rubber: Available under the trade name "Nipol IR2200" from Zeon Corporation Zinc acrylate: "ZN-DA85S" from Nippon Shokubai Co., Ltd.

Zinc stearate: Available under the trade name "Zinc Stearate G" from NOF Corporation Organic Peroxide (1): Dicumyl peroxide, available under the trade name "Percumyl D" from NOF Corporation; one-minute half-life temperature, 175.2° C.

Organic Peroxide (2): Mixture of 1,1-di(t-butylperoxy) cyclohexane and silica, available under the trade name "Perhexa C-40" from NOF Corporation Sulfur (1): Sulfur masterbatch containing 80 wt % of powder sulfur for rubber, available under the trade name Sanmix S-80N from Sanshin Chemical Industry Col., Ltd.

Sulfur (2): Available under the trade name "Sulfax® 5" from Tsurumi Chemical Industry Co., Ltd.); sulfur content, 95 wt %

Water: Pure water (from Seiki Chemical Industrial Co., Ltd.)

Antioxidant A: 2,2'-Methylenebis(4-methyl-6-butylphenol), available under the trade name "Nocrac NS-6" from Ouchi Shinko Chemical Industry Co., Ltd.

Antioxidant B: 2-Mercaptobenzimidazole, available under the trade name "Nocrac MB" from Ouchi Shinko Chemical Industry Co., Ltd.

Zinc oxide: Available as "Grade 3 Zinc Oxide" from Sakai Chemical Co., Ltd.

Zinc salt of pentachlorothiophenol:

Available from Wako Pure Chemical Industries, Ltd.

Formation of Intermediate Layer and Cover (Outermost Layer)

Next, in Examples 1 to 3 and Comparative Examples 1 to 6, an intermediate layer was formed by injection-molding Intermediate Layer Material No. 1 formulated as shown in Table 2 over the core obtained above, thereby producing an intermediate layer-encased sphere. A cover (outermost layer) was then formed by injection-molding Cover Material No. 2 formulated as shown in the same table over the resulting intermediate layer-encased sphere, thereby producing the golf ball. The Type A dimples shown below were formed at this time on the cover surface.

In Comparative Examples 7 and 8, golf balls are produced in the same way as above by injection-molding intermediate layer material No. 1 and cover material No. 2 formulated as shown in Table 2. The Type A dimples shown below are formed on the cover surface in Comparative Examples 7 and 8.

TABLE 2

| Resin composition (pbw) | Acid content (wt %) | No. 1 | No 2 |
|---|---|---|---|
| Himilan® 1706 | 15 | 15 | |
| AM7318 | 18 | 85 | |
| Trimethylolpropane | | | 1.1 |
| TPU | | | 100 |

Trade names for the materials in the above table are given below.

Himilan® 1706: An ionomer available from Dow-Mitsui Polychemicals Co., Ltd.

AM7318: An ionomer available from Dow-Mitsui Polychemicals Co., Ltd.

Trimethylolpropane (TMP):

Available from Tokyo Chemical Industry Co., Ltd.

TPU: An ether-type thermoplastic polyurethane available as Pandex® from DIC Covestro Polymer, Ltd.

Figure 2A:
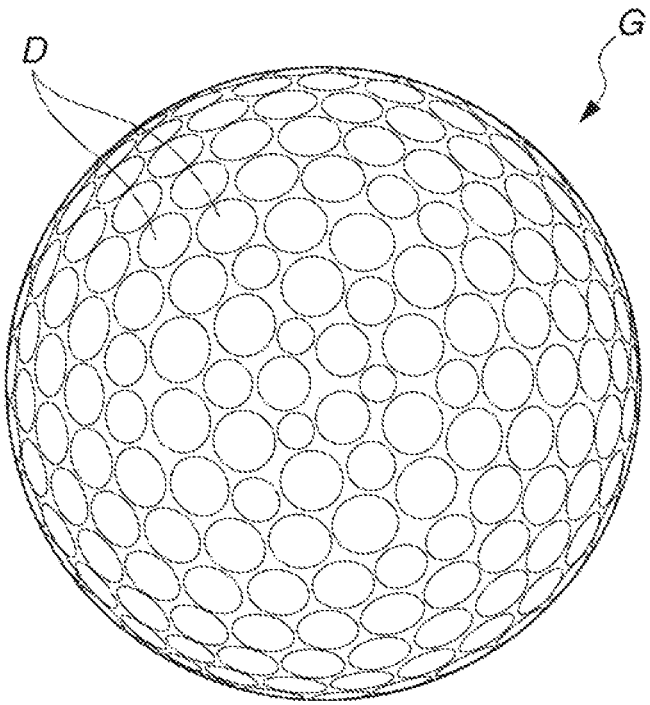
FIG. 2A is a plan view and FIG. 2B is a side view showing the dimple pattern common to all the Examples and the Comparative Examples.
Figure 2B:
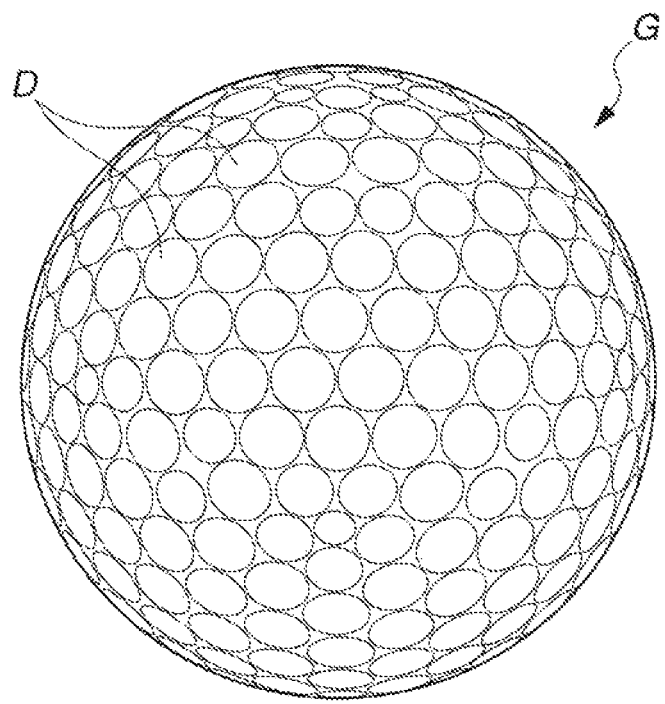

Eight varieties of circular dimples were used as the Type A dimples. The details are shown in Table 3 below. The dimples were arranged as shown in FIG. 2. FIG. 2A is a top view of the dimples and FIG. 2B is a side view of the dimples.

TABLE 3

| Type A dimples | Number | Diameter (mm) | Depth (mm) | Volume (mm$^3$) | Cylinder volume ratio | SR (%) | VR (%) |
|---|---|---|---|---|---|---|---|
| A-1 | 12 | 4.6 | 0.123 | 1.116 | 0.546 | 82.30 | 0.775 |
| A-2 | 198 | 4.45 | 0.122 | 1.036 | 0.546 | | |
| A-3 | 36 | 3.85 | 0.119 | 0.757 | 0.546 | | |
| A-4 | 12 | 2.75 | 0.090 | 0.288 | 0.539 | | |
| A-5 | 36 | 4.45 | 0.136 | 1.120 | 0.530 | | |
| A-6 | 24 | 3.85 | 0.133 | 0.820 | 0.530 | | |
| A-7 | 6 | 3.4 | 0.118 | 0.563 | 0.526 | | |
| A-8 | 6 | 3.3 | 0.118 | 0.530 | 0.525 | | |
| Total | 330 | | | | | | |

Dimple Definitions

Edge: Highest place in cross-section passing through center of dimple.

Diameter: Diameter of flat plane circumscribed by edge of dimple.

Depth: Maximum depth of dimple from flat plane circumscribed by edge of dimple.

SR: Sum of individual dimple surface areas, each defined by flat plane circumscribed by edge of dimple, as a percentage of spherical surface area of ball were it to have no dimples thereon.

Dimple volume: Dimple volume below flat plane circumscribed by edge of dimple.

Cylinder volume ratio: Ratio of dimple volume to volume of cylinder having same diameter and depth as dimple.

VR: Sum of volumes of individual dimples formed below flat plane circumscribed by edge of dimple, as a percentage of volume of ball sphere were it to have no dimples thereon.

The coefficient of lift CL1 measured at a Reynolds number of 80,000 and a spin rate of 2,000 rpm, the coefficient of lift CL2 measured at a Reynolds number of 70,000 and a spin rate of 1,900 rpm, the coefficient of lift CL3 measured at a Reynolds number of 200,000 and a spin rate of 2,500 rpm, the coefficient of lift CL4 measured at a Reynolds number of 120,000 and a spin rate of 2,250 rpm and the values of the ratios CL2/CL1 and CL4/CL3 for golf balls having the above Type A dimples formed on the surface of the cover are shown in Table 4 below. These coefficients of lift are measured in conformity with the Indoor Test Range (ITR) method established by the United States Golf Association (USGA).

TABLE 4

| | CL1 | CL2 | CL3 | CL4 | CL2/CL1 | CL4/CL3 |
|---|---|---|---|---|---|---|
| Type A dimples | 0.234 | 0.238 | 0.148 | 0.186 | 1.018 | 1.262 |

Formation of Coating Layer

Next, in Examples 1 to 3 and Comparative Examples 1 to 6, the coating composition shown in Table 5 below, which is common to all the Examples and Comparative Examples, was applied with an air spray gun onto the surface of the cover (outermost layer) having numerous dimples formed thereon, producing golf balls with a 15 μm thick coating layer on top.

The above coating is applied in the same way in Comparative Examples 7 and 8, producing golf balls with a 15 μm thick coating layer on top.

TABLE 5

| Coating composition (pbw) | Base resin | Polyester polyol (A) | 23 |
|---|---|---|---|
| | | Polyester polyol (B) | 15 |
| | | Organic solvent | 62 |
| | Curing agent | Isocyanate (HMDI isocyanurate) | 42 |
| | | Solvent | 58 |
| | Molar blending ratio (NCO/OH) | | 0.89 |
| Properties of coat | Elastic work recovery (%) | | 84 |
| | Shore M hardness | | 84 |
| | Shore C hardness | | 63 |
| | Thickness (μm) | | 15 |

Synthesis of Polyester Polyol (A)

A reactor equipped with a reflux condenser, a dropping funnel, a gas inlet and a thermometer is charged with 140 parts by weight of trimethylolpropane, 95 parts by weight of ethylene glycol, 157 parts by weight of adipic acid and 58 parts by weight of 1,4-cyclohexanedimethanol, following which the reaction is effected by raising the temperature to between 200 and 240° C. under stirring and heating for 5 hours. This yielded Polyester Polyol (A) having an acid value of 4, a hydroxyl value of 170 and a weight-average molecular weight (Mw) of 28,000.

Next, the Polyester Polyol (A) thus synthesized is dissolved in butyl acetate, thereby preparing a varnish having a nonvolatiles content of 70 wt %.

The base resin for the coating composition in Table 5 is prepared by mixing together 23 parts by weight of the above polyester polyol solution, 15 parts by weight of Polyester Polyol (B) (the saturated aliphatic polyester polyol NIPPOLAN 800 from Tosoh Corporation; weight-average molecular weight (Mw), 1,000; 100/o solids) and the organic solvent. This mixture had a nonvolatiles content of 38.0 wt %.

Elastic Work Recovery

The elastic work recovery of the coating material is measured using a coating sheet having a thickness of 50 μm. The ENT-2100 nanohardness tester from Erionix Inc. is used as the measurement apparatus, and the measurement conditions are as follows.

Indenter: Berkovich indenter (material: diamond; angle α: 65.03°)
Load F: 0.2 mN
Loading time: 10 seconds
Holding time: 1 second
Unloading time: 10 seconds The elastic work recovery is calculated as follows, based on the indentation work $W_{elast}$ (Nm) due to spring-back deformation of the coating and on the mechanical indentation work $W_{total}$ (Nm).

$$\text{Elastic work recovery} = W_{elast}/W_{total} \times 100 (\%)$$

Shore C Hardness and Shore M Hardness

The Shore C hardness and Shore M hardness in Table 5 above are determined by forming the material to be tested into 2 mm thick sheets and stacking three such sheets together to give a test specimen. Measurements are taken using a Shore C durometer and a Shore M durometer in accordance with ASTM D2240.

Various properties of the resulting golf balls, including the internal hardnesses of the core at various positions, the diameters of the core and each layer-encased sphere, the thickness and material hardness of each layer, and the surface hardness of each layer-encased sphere, are evaluated by the following methods. The results are presented in Table 6.

Diameters of Core and Intermediate Layer-Encased Sphere

The spheres to be measured are held isothermally for at least 3 hours in a thermostatic chamber adjusted to 23.9±1° C., following which they are measured in a 23.9±2° C. room. The diameters at five random places on the surface of each sphere are measured and, using the average of these measurements as the measured value for a single sphere, the average diameter for ten such spheres is determined.

Ball Diameter

The balls to be measured are held isothermally for at least 3 hours in a thermostatic chamber adjusted to 23.9±1° C., following which they are measured in a 23.9±2° C. room. The diameters at 15 random dimple-free areas are measured and, using the average of these measurements as the measured value for a single ball, the average diameter for ten balls is determined.

Deflections of Core and Ball

The core or ball is placed on a hard plate and the amount of deflection when compressed under a final load of 1,275 N (130 kgf) from an initial load of 98 N (10 kgf) is measured. The amount of deflection is the measured value obtained after temperature conditioning the core or ball at 23.9° C. The rate at which pressure is applied by the head which compresses the ball is set to 10 mm/s.

Core Hardness Profile

The indenter of a durometer is set substantially perpendicular to the spherical surface of the core and the surface hardness on the Shore C hardness scale is measured in accordance with ASTM D2240. The hardnesses at the center and specific positions of the core are measured as Shore C hardness values by perpendicularly pressing the indenter of a durometer against the center portion and the specific positions shown in Table 6 on the flat cross-section obtained by cutting the core into hemispheres. The P2 Automatic Rubber Hardness Tester (Kobunshi Keiki Co., Ltd.) equipped with a Shore C durometer can be used for measuring the hardness. The maximum value is read off as the hardness value. Measurements are all carried out in a 23±2° C. environment. The numbers in Table 6 are Shore C hardness values.

Figure 5:
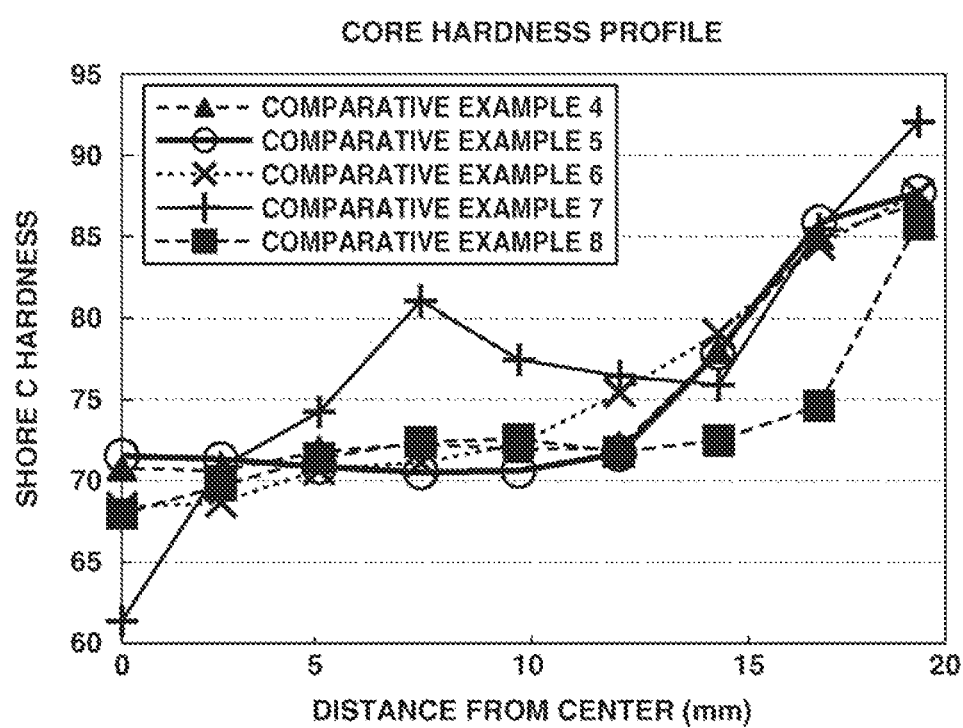
FIG. 5 is a graph showing the core hardness profiles in Comparative Examples 4 to 8.

FIGS. 3, 4 and 5 show graphs of the core hardness profiles for Examples 1 to 3 and Comparative Examples 1 to 8.

Material Hardnesses of Intermediate Layer and Cover

The resin material for each layer is molded into a sheet having a thickness of 2 mm and left to stand for at least two weeks. The Shore C hardness and Shore D hardness of each material is then measured in accordance with ASTM D2240. The P2 Automatic Rubber Hardness Tester (Kobunshi Keiki Co., Ltd.) is used for measuring the hardness. Shore C hardness and Shore D hardness attachments are mounted on the tester and the respective hardnesses are measured. The maximum value is read off as the hardness value. All measurements are carried out in a 23+2° C. environment.

Surface Hardnesses of Intermediate Layer-Encased Sphere and Ball

These hardnesses are measured by perpendicularly pressing an indenter against the surfaces of the respective spheres. The surface hardness of a ball (cover) is the value measured at a dimple-free area (land) on the surface of the ball. The Shore C and Shore D hardnesses are measured in accordance with ASTM D2240. The P2 Automatic Rubber Hardness Tester (Kobunshi Keiki Co., Ltd.) is used for measuring the hardness. Shore C hardness and Shore D hardness attachments are mounted on the tester and the respective hardnesses are measured. The maximum value is read off as the hardness value. Measurements are all carried out in a 23±2° C. environment.

TABLE 6

|  |  | Example | | | Comparative Example | | | | | | | |
|---|---|---|---|---|---|---|---|---|---|---|---|---|
|  |  | 1 | 2 | 3 | 1 | 2 | 3 | 4 | 5 | 6 | 7 | 8 |
|  | Construction (piece) | 3P | 3P | 3P | 3P | 3P | 3P | 3P | 3P | 3P | 3P | 3P |
| Core | Diameter (mm) | 38.65 | 38.62 | 38.62 | 38.60 | 38.61 | 38.64 | 38.61 | 38.63 | 38.62 | 38.63 | 38.62 |
|  | Weigh (g) | 35.08 | 34.94 | 35.00 | 35.03 | 35.02 | 35.09 | 35.02 | 35.03 | 34.96 | 35.01 | 35.02 |
|  | Deflection (mm) | 3.11 | 3.12 | 3.30 | 2.80 | 2.97 | 3.01 | 3.03 | 2.94 | 2.92 | 2.97 | 3.21 |
| Core hardness profile | H100 (Shore C) | 87.4 | 89.1 | 87.9 | 91.1 | 89.8 | 89.1 | 86.9 | 87.6 | 87.4 | 92.0 | 85.6 |
|  | H87.5 (Shore C) | 86.9 | 87.4 | 86.2 | 89.0 | 88.1 | 87.0 | 85.0 | 85.7 | 84.4 | 85.4 | 74.5 |
|  | H75 (Shore C) | 78.9 | 76.8 | 75.0 | 80.6 | 80.4 | 78.1 | 78.0 | 77.8 | 79.0 | 75.8 | 72.4 |
|  | H62.5 (Shore C) | 71.1 | 71.3 | 69.5 | 73.7 | 72.4 | 72.8 | 72.0 | 71.6 | 75.4 | 76.4 | 71.7 |
|  | H50 (Shore C) | 71.2 | 71.7 | 70.4 | 74.4 | 72.0 | 73.2 | 71.9 | 70.6 | 72.2 | 77.4 | 72.5 |
|  | H37.5 (Shore C) | 71.5 | 72.1 | 70.8 | 74.9 | 72.5 | 73.6 | 72.2 | 70.5 | 71.1 | 81.1 | 72.4 |
|  | H25 (Shore C) | 71.3 | 71.7 | 70.5 | 73.5 | 72.5 | 73.3 | 71.7 | 70.9 | 70.6 | 74.2 | 71.4 |
|  | H12.5 (Shore C) | 69.0 | 69.2 | 68.7 | 72.5 | 71.9 | 71.8 | 70.6 | 71.3 | 68.7 | 70.9 | 69.7 |
|  | H0 (Shore C) | 66.7 | 67.2 | 67.0 | 71.6 | 71.7 | 70.7 | 70.9 | 71.5 | 68.3 | 61.4 | 68.0 |
|  | H75-H50 (Shore C) | 7.7 | 5.1 | 4.6 | 6.2 | 8.4 | 4.9 | 6.1 | 7.2 | 6.8 | -1.6 | -0.1 |
|  | H25-H0 (Shore C) | 4.6 | 4.5 | 3.5 | 1.9 | 0.8 | 2.6 | 0.8 | -0.6 | 2.3 | 12.8 | 3.4 |
|  | H100-H87.5 (Shore C) | 0.5 | 1.7 | 1.7 | 2.1 | 1.7 | 2.1 | 1.9 | 1.9 | 3.0 | 6.6 | 11.1 |
|  | H50-H25 (Shore C) | -0.1 | 0.0 | -0.1 | 0.9 | -0.5 | -0.1 | 0.2 | -0.3 | 1.6 | 3.2 | 1.1 |
|  | H100-H0 (Shore C) | 20.7 | 21.9 | 20.9 | 19.5 | 18.1 | 18.4 | 16.0 | 16.1 | 19.1 | 30.6 | 17.6 |
|  | H87.5-H0 (Shore C) | 20.2 | 20.2 | 19.2 | 17.4 | 16.4 | 16.3 | 14.1 | 14.2 | 16.1 | 24.0 | 6.5 |
|  | (H75-H50)-(H25-H0) (Shore C) | 3.1 | 0.6 | 1.1 | 4.3 | 7.6 | 2.3 | 5.3 | 7.8 | 4.5 | -14.4 | -3.5 |
|  | (H25-H0)-(H100-H87.5) (Shore C) | 4.1 | 2.8 | 1.8 | -0.2 | -0.9 | 0.5 | -1.1 | -2.5 | -0.7 | 6.2 | -7.7 |
|  | (H100-H87.5)-(H50-H25) (Shore C) | 0.6 | 1.7 | 1.8 | 1.2 | 2.2 | 2.2 | 1.7 | 2.2 | 1.4 | 3.4 | 10.0 |
|  | (H87.5-H0)/(H50-H0) | 4.5 | 4.5 | 5.6 | 6.2 | 54.7 | 6.5 | 14.1 | -15.8 | 4.1 | 1.5 | 1.4 |
| Intermediate layer | Material | No. 1 | No. 1 | No. 1 | No. 1 | No. 1 | No. 1 | No. 1 | No. 1 | No. 1 | No. 1 | No. 1 |
|  | Thickness (mm) | 1.18 | 1.21 | 1.21 | 1.21 | 1.21 | 1.20 | 1.21 | 1.20 | 1.21 | 1.20 | 1.20 |
|  | Specific gravity | 0.94 | 0.95 | 0.95 | 0.95 | 0.94 | 0.94 | 0.95 | 0.94 | 0.94 | 0.94 | 0.94 |
|  | Material hardness   Shore C | 93 | 93 | 93 | 93 | 93 | 93 | 93 | 93 | 93 | 93 | 93 |
|  | Shore D | 66 | 66 | 66 | 66 | 66 | 66 | 66 | 66 | 66 | 66 | 66 |
| Intermediate layer-encased sphere | Diameter (mm) | 41.00 | 41.04 | 41.03 | 41.02 | 41.03 | 41.03 | 41.04 | 41.03 | 41.03 | 41.03 | 41.03 |
|  | Weight (g) | 40.60 | 40.65 | 40.69 | 40.74 | 40.67 | 40.69 | 40.72 | 40.68 | 40.65 | 40.65 | 40.69 |
|  | Surface hardness   Shore C | 98 | 98 | 98 | 98 | 98 | 98 | 98 | 98 | 98 | 98 | 98 |
|  | Shore D | 72 | 72 | 72 | 72 | 72 | 72 | 72 | 72 | 72 | 72 | 72 |
| Intermediate layer surface hardness-Core surface hardness (Shore C) | | 11 | 9 | 10 | 7 | 8 | 9 | 11 | 10 | 11 | 6 | 12 |
| Cover | Material | No. 2 | No. 2 | No. 2 | No. 2 | No. 2 | No. 2 | No. 2 | No. 2 | No. 2 | No. 2 | No. 2 |
|  | Thickness (mm) | 0.83 | 0.81 | 0.82 | 0.82 | 0.82 | 0.82 | 0.82 | 0.82 | 0.82 | 0.82 | 0.82 |
|  | Material hardness   Shore C | 74 | 74 | 74 | 74 | 74 | 74 | 74 | 74 | 74 | 74 | 74 |
|  | Snore D | 47 | 47 | 47 | 47 | 47 | 47 | 47 | 47 | 47 | 47 | 47 |
| Dimples | Configuration | Type A | Type A | Type A | Type A | Type A | Type A | Type A | Type A | Type A | Type A | Type A |
|  | Numher | 330 | 330 | 330 | 330 | 330 | 330 | 330 | 330 | 330 | 330 | 330 |
| Ball | Diameter (mm) | 42.66 | 42.66 | 42.67 | 42.66 | 42.67 | 42.67 | 42.67 | 42.68 | 42.68 | 42.66 | 42.67 |
|  | Weight (g) | 45.42 | 45.38 | 45.46 | 45.50 | 45.45 | 45.48 | 45.45 | 45.44 | 45.40 | 45.42 | 45.45 |
|  | Deflection (mm) | 2.46 | 2.43 | 2.58 | 2.26 | 2.37 | 2.40 | 2.47 | 2.39 | 2.40 | 2.37 | 2.51 |
|  | Surface hardness   Shore C | 87 | 87 | 87 | 87 | 87 | 87 | 87 | 87 | 87 | 87 | 87 |
|  | Shore D | 60 | 60 | 60 | 60 | 60 | 60 | 60 | 60 | 60 | 60 | 60 |
| Intermediate layer surface hardness-Ball surface hardness (Shore C) | | 11 | 11 | 11 | 11 | 11 | 11 | 11 | 11 | 11 | 11 | 11 |
| (Ball deflection)/(Core detlectson) | | 0.79 | 0.78 | 0.78 | 0.81 | 0.80 | 0.80 | 0.82 | 0.81 | 0.82 | 0.80 | 0.78 |
| (Core deflection)-(Ball deflection) (mm) | | 0.65 | 0.69 | 0.72 | 0.54 | 0.60 | 0.61 | 0.56 | 0.55 | 0.52 | 0.60 | 0.71 |

The flight performances (W #1 and I #6), spin rate on approach shots and durability to repeated impact of each golf ball are evaluated by the following methods. The results are shown in Table 7.

Evaluation of Flight (W #1)

A driver (W #1) is mounted on a golf swing robot and the spin rate and total distance of the ball when struck at a head speed (HS) of 53 m/s are each measured. The club used is the Tour B XD-5 Driver (loft angle, 8.5°) manufactured by Bridgestone Sports Co., Ltd. The spin rate of the ball immediately after being similarly struck is measured with a launch monitor.

In addition, a driver (W #1) is mounted on a golf swing robot and the spin rate and total distance of the ball when struck at a head speed of 48 n/s are each measured. The club used is the JGR (2016 model) Driver (loft angle, 9.5°) manufactured by Bridgestone Sports Co., Ltd.

The sum of the distances traveled by the ball under the above two conditions is calculated and the flight performance is evaluated based on the following criteria.

Rating Criteria:
Good: Total distance (W #1, sum of two conditions) is 498.0 m or more
Fair: Total distance (W #1, sum of two conditions) is at least 497.0 m, but less than 498.0 m
NG: Total distance (W #1, sum of two conditions) is less than 497.0 mm Evaluation of Flight (I #6)

A middle iron (I #6) is mounted on a golf swing robot and the distance traveled by the ball when struck at a head speed of 43.5 m/s is measured. The club used is the JGR Forged (2016 model) manufactured by Bridgestone Sports Co., Ltd. The spin rate of the ball immediately after being similarly struck is measured with a launch monitor.

Rating Criteria:
Good: Total distance is 178.0 m or more
Fair: Total distance is at least 177.0 m, but less than 178.0 m
NG: Total distance is less than 177.0 mm Evaluation of Spin Rate on Approach Shots A sand wedge is mounted on a golf swing robot and the spin rate of the ball when struck at a head speed of 15 m/s is rated according to the criteria shown below. The spin rate of the ball immediately after being similarly struck is measured with a launch monitor. The sand wedge used is the TourStage TW-03 (loft angle, 57°), 2002 model, manufactured by Bridgestone Sports Co., Ltd.

Rating Criteria:
Good: Spin rate is 4,000 rpm or more
NG: Spin rate is less than 4,000 rpm Durability to Repeated Impact A test is performed in which, when a golf ball is fired at a velocity of 43 m/s and made to repeatedly strike a steel plate, the number of shots until the ball begin to crack is observed. N=30 sample balls are repeatedly struck in this way and the minimum number of shots after which the balls begin to crack is evaluated. Durability indices for the balls in the respective Examples are calculated relative to an arbitrary value of 100 for the number of shots needed for the ball in Example 2 to crack.

Rating Criteria:
Good: Index is 90 or more
NG: Index is less than 90

In Comparative Example 3, $(H87.5-H0)<17$. As a result, the spin rate on shots with a driver (W #1) rose and a good distance was not achieved.

In Comparative Example 4, the core hardness profile was such that $(H25-H0)<(H100-H87.5)$ and $(H87.5-H0)<17$. As a result, the spin rate on shots with a driver (W #1) rose and a good distance was not achieved.

In Comparative Example 5, the core hardness profile was such that $(H25-H0)<(H100-H87.5)$ and $(H87.5-H0)<17$. As a result, the spin rate on shots with a driver (W #1) rose and a good distance was not achieved.

In Comparative Example 6, the core hardness profile was such that $(H25-H0)<(H100-H87.5)$ and $(H87.5-H0)<17$. As a result, the spin rate on shots with a driver (W #1) and a middle iron (I #6) rose and a good distance was not achieved.

In Comparative Example 7, the core hardness profile is such that $(H75-H50)<(H25-H0)$, $(H87.5-H0)>23.0$ and the absolute value of $(H87.5-H0)/(H50-H0)<3.0$. The initial velocity on full shots decreases and the distance is inferior, in addition to which the durability to repeated impact is poor.

In Comparative Example 8, the core hardness profile is such that $(H75-H50)<(H25-H0)$, $(H87.5-H0)<17$ and the absolute value of $(H87.5-H0)/(H50-H0)<3.0$. The balance between the spin rate and the initial velocity on shots with a driver (W #1) is poor, and so a good distance is not achieved.

Japanese Patent Application No. 2021-137782 is incorporated herein by reference.

TABLE 7

|  |  |  | Example | | | Comparative Example | | | | | | | |
|---|---|---|---|---|---|---|---|---|---|---|---|---|
|  |  |  | 1 | 2 | 3 | 1 | 2 | 3 | 4 | 5 | 6 | 7 | 8 |
| Flight | W#1 HS = 53 m/s | Spin rate (rpm) | 2,618 | 2,625 | 2,489 | 2,714 | 2,654 | 2,694 | 2,694 | 2,651 | 2,641 | 2,624 | 2,607 |
|  |  | Total distance (m) | 263.1 | 262.5 | 262.0 | 257.7 | 260.0 | 260.0 | 260.6 | 257.6 | 262.1 | 261.6 | 261.4 |
|  | W#1 HS = 48 m/s | Spin rate (rpm) | 3,000 | 2,990 | 2,909 | 3,081 | 3,073 | 3,045 | 3,049 | 3,048 | 3,025 | 2,991 | 2,999 |
|  |  | Total distance (m) | 235.4 | 236.8 | 236.5 | 237.1 | 232.8 | 236.5 | 235.2 | 233.6 | 234.9 | 235.5 | 235.5 |
|  | W#1 Sum of two conditions | Total distance (m) | 498.5 | 499.3 | 498.5 | 494.9 | 492.8 | 496.5 | 495.8 | 491.2 | 497.1 | 497.1 | 496.9 |
|  |  | Rating | good | good | good | NG | NG | NG | NG | NG | fair | fair | NG |
| Flight | I#6 HS = 43.5 m/s | Spin rate (rpm) | 5,624 | 5,670 | 5,365 | 5,918 | 5,700 | 5,705 | 5,623 | 5,708 | 5,558 | 5,664 | 5,618 |
|  |  | Total distance (m) | 178.3 | 178.1 | 179.6 | 175.9 | 178.5 | 178.7 | 179.4 | 178.6 | 176.6 | 177.5 | 178.3 |
|  |  | Rating | good | good | good | NG | good | good | good | good | NG | fair | good |
| Approach shots, HS = 15 m/s |  | Spin rate (rpm) | 4853 | 4863 | 4814 | 4919 | 4883 | 4873 | 4850 | 4876 | 4873 | 4883 | 4839 |
|  |  | Rating | good | good | good | good | good | good | good | good | good | good | good |
| Durability to repeated impact |  | Rating | good | good | good | NG | NG | good | good | good | good | NG | good |

As demonstrated by the results in Table 7, the golf balls of Comparative Examples 1 to 8 are inferior in the following respects to the golf balls according to the present invention that are obtained in Examples 1 to 3.

In Comparative Example 1, the core hardness profile was such that $(H25-H0)<(H100-H87.5)$. As a result, the spin rate of the ball on shots with a driver (W #1) and a middle iron (I #6) rose and a good distance was not achieved.

In Comparative Example 2, the core hardness profile was such that $(H25-H0)<(H100-H87.5)$ and $(H87.5-H0)<17$. As a result, the spin rate on shots with a driver (W #1) rose and a good distance was not achieved.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a single-layer core, a cover and at least one intermediate layer interposed between the core and the cover, wherein the sphere obtained by encasing the core with the intermediate layer (intermediate layer-encased sphere) and the ball have a surface hardness relationship therebetween which satisfies the condition:

(surface hardness of intermediate layer-encased sphere)>(surface hardness of ball);

the core has a diameter of from 35.5 to 39.5 mm and a corresponding radius; and the core has a hardness profile which satisfies the following conditions:

$(H75-H50)>(H25-H0)>(H100-H87.5)>(H50-H25)$ $23.0 \geq (H87.5-H0) \geq 17.0$ absolute value of $(H87.5-H0)/(H50-H0) \geq 3.0$, where H100 is the Shore C hardness at a surface of the core, H87.5 is the Shore C hardness at a position 87.5% of the core radius outward from a center of the core, H75 is the Shore C hardness at a position 75% of the core radius outward from the core center, H62.5 is the Shore C hardness at a position 62.5% of the core radius outward from the core center, H50 is the Shore C hardness at a position 50% of the core radius outward from the core center, H37.5 is the Shore C hardness at a position 37.5% of the core radius outward from the core center, H25 is the Shore C hardness at a position 25% of the core radius outward from the core center, H12.5 is the Shore C hardness at a position 12.5% of the core radius outward from the core center and H0 is the Shore C hardness at the core center.

2. The golf ball of claim 1 which satisfies the condition:

$0 \leq (H100-H87.5) \leq 3.0$.

3. The golf ball of claim 1 which satisfies the condition:

$4.0 \leq (H75-H50) \leq 9.0$.

4. The golf ball of claim 1 which satisfies the condition:

$-1.05 \leq (H50-H25) \leq 1.0$.

5. The golf ball of claim 1 which satisfies the condition:

$3.0 \leq (H25-H0) \leq 6.0$.

6. The golf ball of claim 1, wherein the core has a deflection of from 2.5 to 3.5 mm when compressed under a final load of 1,275 N (130 kgf) from an initial load of 98 N (10 kgf) and the ball has a deflection of from 2.1 to 2.8 mm when compressed under a final load of 1,275 N (130 kgf) from an initial load of 98 N (10 kgf).

7. The golf ball of claim 1 wherein, letting CL1 be the coefficient of lift measured at a Reynolds number of 80,000 and a spin rate of 2,000 rpm and CL2 be the coefficient of lift measured at a Reynolds number of 70,000 and a spin rate of 1,900, CL1 and CL2 satisfy the condition:

$0.900 \leq CL2/CL1$.

8. The golf ball of claim 1 wherein, letting CL3 be the coefficient of lift measured at a Reynolds number of 200,000 and a spin rate of 2,500 rpm and CL4 be the coefficient of lift measured at a Reynolds number of 120,000 and a spin rate of 2,250, CL3 and CL4 satisfy the condition:

$1.250 \leq CL4/CL3 \leq 1.300$.

9. The golf ball of claim 1, wherein the core is a material molded under heat from a rubber composition comprising:
(A) a base rubber,
(B) an organic peroxide,
(C) water or a metal monocarboxylate or both, and
(D) sulfur.

10. The golf ball of claim 9, wherein components (C) and (D) have a weight ratio (D)/(C) therebetween which is from 0.02 to 0.20.

* * * * *